United States Patent
Okumura

(10) Patent No.: US 7,551,250 B2
(45) Date of Patent: Jun. 23, 2009

(54) LIQUID CRYSTAL DISPLAY DEVICE AND PROJECTION DISPLAY APPARATUS

(75) Inventor: Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 681 days.

(21) Appl. No.: 11/016,961

(22) Filed: Dec. 21, 2004

(65) Prior Publication Data

US 2005/0151903 A1    Jul. 14, 2005

(30) Foreign Application Priority Data

Jan. 13, 2004    (JP) .............................. 2004-005470

(51) Int. Cl.
    G02F 1/1335    (2006.01)
(52) U.S. Cl. ............................ 349/117; 349/121; 349/5
(58) Field of Classification Search ............. 349/74–76, 349/117–121, 5
    See application file for complete search history.

(56) References Cited

U.S. PATENT DOCUMENTS

| | | | |
|---|---|---|---|
| 6,307,608 B1 | 10/2001 | Sakamoto | |
| 6,580,484 B2 | 6/2003 | Okamoto et al. | |
| 6,784,961 B2 | 8/2004 | Suzuki et al. | |
| 6,885,421 B2 * | 4/2005 | Miyachi | 349/119 |
| 6,885,422 B2 | 4/2005 | Suzuki et al. | |
| 7,030,951 B2 | 4/2006 | Suzuki et al. | |
| 7,307,679 B2 * | 12/2007 | Toyooka et al. | 349/99 |
| 2004/0119914 A1 * | 6/2004 | Tsuchiya | 349/98 |
| 2006/0114385 A1 * | 6/2006 | Ito et al. | 349/119 |

FOREIGN PATENT DOCUMENTS

| | | |
|---|---|---|
| CN | A-1261961 | 8/2000 |
| CN | A-1281157 | 1/2001 |
| EP | 834752 A1 * | 4/1998 |
| JP | A-08-050206 | 2/1996 |
| JP | 09-005524 | 1/1997 |
| JP | A-09-015587 | 1/1997 |
| JP | A-9-222511 | 8/1997 |
| JP | A-10-161106 | 6/1998 |
| JP | 2000-275434 | 10/2000 |
| JP | A-2001-13501 | 1/2001 |

(Continued)

OTHER PUBLICATIONS

"Introduction Lecture 11 for Liquid Crystal Display" Viewing-Angle Enlargement Technique of TFT-LCD with Discotic Optical Compensating Plate, Ekicho, vol. 6, No. 1, 2002, pp. 83-92 (with partial translation).

*Primary Examiner*—Mike Qi
(74) *Attorney, Agent, or Firm*—Oliff & Berridge, PLC

(57) ABSTRACT

A liquid crystal display device capable of obtaining a high contrast ratio within a range of entry angles of source light to an optical modulation device of a projection display apparatus has a liquid crystal panel operating in a twisted nematic mode, a first optical compensating plate disposed at the light-entry side of the liquid crystal panel, and a second optical compensating plate disposed at the light-exit side thereof. The respective optical compensating plates hybrid-aligns liquid crystal molecules having a negative birefringence, a phase retardation in the normal direction thereof of 10 nm or more and 30 nm or less, and fast axis directions, as seen in the respective normal directions, intersect each other at an angle other than a right angle.

7 Claims, 13 Drawing Sheets

FOREIGN PATENT DOCUMENTS

| | | |
|---|---|---|
| JP | A-2000-014345 | 1/2002 |
| JP | A-2002-014233 | 1/2002 |
| JP | 2002-182213 | 6/2002 |
| JP | A-2003-322853 | 11/2003 |
| KR | 1999-016189 | 3/1999 |
| WO | WO 98/52093 | 11/1998 |

* cited by examiner

LIQUID CRYSTAL DISPLAY DEVICE AND PROJECTION DISPLAY APPARATUS

BACKGROUND

The exemplary embodiments of the present invention relate to a liquid crystal display device and a projection display apparatus.

Liquid crystal display devices are used as optical modulation devices of projection display apparatuses, such as a liquid crystal projector. In the liquid crystal display devices, a liquid crystal layer is interposed between a pair of substrates. An electrode to apply an electric field to the liquid crystal layer is formed inside the pair of substrates. An alignment film to control an alignment state of liquid crystal molecules is formed inside the electrode. Image light is formed on the basis of variation in the alignment of the liquid crystal molecules at the time of applying a non-selection voltage and at the time of applying a selection voltage.

In the projection display apparatus employing the related art liquid crystal display device, the contrast ratio of a projected image is at most 1:500, which is still smaller than the contrast ratio of 1:3000 in the projection display apparatus employing a mechanical shutter such as DLP (registered trade mark) technology using DMD (digital micromirror device). This results from a viewing angle characteristic of the liquid crystal display device. Originally, the source light which enters the optical modulation device of the projection display apparatus is not a complete parallel light. Since the liquid crystal display device used as the optical modulation device has an entry-angle dependency, this causes reduction of the contrast ratio of the projected image.

Therefore, in order to compensate for the entry-angle dependency of the liquid crystal display device, an optical compensating plate is employed. The optical compensating plate hybrid-aligns discotic liquid crystal molecules showing a negative birefringence (see, for example, Japanese Unexamined Patent Application Publication No. H8-50206 and "Introduction Lecture 11 for Liquid Crystal Display: Viewing-angle Enlargement Technique of TFT-LCD with Discotic Optical Compensating plate", Liquid Crystal, Japan Liquid Crystal Society, Vol. 6, No. 1, p 84-92, Jan. 25, 2002, by Hiroyuki Mori). As seen in the normal direction, the optical compensating plate has a fast axis and a slow axis due to the hybrid alignment. Accordingly, the optical compensating plate has a phase retardation in the normal direction.

FIG. 13 is a graph illustrating a viewing-angle dependency of the phase retardation in the optical compensating plate described in Japanese Unexamined Patent Application Publication No. H8-50206. It can be seen from FIG. 13 that the phase retardation when the viewing angle to the optical compensating plate is 0°, that is, the phase retardation in the normal direction of the optical compensating plate, is about 40 nm. Examples where the phase retardation in the normal direction of the optical compensating plate is 70 nm and 80 nm are disclosed in Japanese Unexamined Patent Application Publication No. H9-15587.

In addition, a first optical compensating plate is disposed at the outside of the substrate at the light-entry side in the liquid crystal panel and a second optical compensating plate is disposed at the outside of the substrate at the light-exit side. The first optical compensating plate and the second optical compensating plate are disposed such that the fast axis direction (that is, the X axis direction which is an alignment control direction of the discotic liquid crystal and is indicated by Arrow 71 in FIG. 5 which shows an exemplary embodiment of the invention) as seen in the normal direction of the respective optical compensating plates is approximately equal to the alignment control direction of the alignment film in the corresponding substrate. Since the alignment control directions of the respective substrates in the liquid crystal panel are approximately perpendicular to each other, the alignment control directions of the optical compensating plates are approximately perpendicular to each other.

SUMMARY

However, the optical compensating plate has been originally developed for use in a direct-view liquid crystal panel, and is designed to obtain a high contrast ratio in a wide range of a viewing angle. On the contrary, the entry angle of the source light to an optical modulation device of a projection display apparatus is at most a polar angle of about 12°. A projection image is formed by the entry light having such a narrow angle range. Accordingly, a liquid crystal display device capable of obtaining higher contrast ratio in the narrow angle range is desirable.

On the other hand, when an electric field is applied to the liquid crystal layer of the liquid crystal panel, the liquid crystal molecules around the center of the liquid crystal layer are vertically aligned, but the liquid crystal molecules around the alignment film are not completely vertically aligned. As a result, at the time of applying an electric field, the liquid crystal panel has a slight phase retardation as observed in the normal direction. This phase retardation causes the leakage of light at the time of displaying black, thereby deteriorating the contrast ratio in the normal direction of the liquid crystal panel.

The exemplary embodiments of the present invention solve or address the above and/or other problems, and provide a liquid crystal display device having a high contrast ratio within an entry-angle range of source light to an optical modulation device of a projection display apparatus. A projection display apparatus of which a projected image has a high contrast ratio is also provided.

According to the exemplary embodiments of the present invention, there is provided a liquid crystal display device having a liquid crystal panel in which a liquid crystal layer is interposed between a pair of substrates, the liquid crystal panel operating in a twisted nematic mode, a first optical compensating plate which hybrid-aligns liquid crystal molecules having a negative birefringence being disposed at the outside of at least one substrate of the pair of substrates of the liquid crystal panel, and a phase retardation in the normal direction of the first optical compensating plate being 10 nm or more and 30 nm or less.

According to this construction, the phase retardation in the normal direction of the liquid crystal panel can be compensated for by the optical compensating plates. As a result, it is possible to discourage, reduce and/or prevent the leakage of light at the time of displaying black, so that it is possible to obtain a high contrast ratio within a range of an entry angle of the source light to an optical modulation device of a projection display apparatus.

The first optical compensating plate may be disposed at the outside of the one substrate of the pair of substrates and a second optical compensating plate may be disposed at the outside of an other substrate of the pair of substrates. Here, the first optical compensating plate and the second optical compensating plate may be disposed such that fast axes in the respective normal directions thereof intersect each other at an angle other than a right angle.

According to this construction, the phase retardation of the liquid crystal layer at one substrate side in the liquid crystal panel can be compensated for by the first optical compensating plate and the phase retardation of the liquid crystal layer at the other substrate side can be compensated for by the second optical compensating plate. By allowing the fast axes of the first optical compensating plate and the second optical compensating plate to intersect each other at an angle other than a right angle, the phase retardation in the normal direction can be generated as a whole of the optical compensating plates, so that it is possible to compensate for the phase retardation in the normal direction in the liquid crystal panel. Therefore, it is possible to obtain a high contrast ratio within a range of the entry angle of the source light to the optical modulation device in the projection display apparatus.

The first optical compensating plate may be disposed at the outside of the one substrate of the pair of substrates and a second optical compensating plate may be disposed at the outside of the first optical compensating plate. In addition, the second optical compensating plate may be disposed such that a surface with a smaller angle formed by an optical axis of the liquid crystal molecules and the normal direction of the second compensating plate is provided opposite to the first optical compensating plate, and the first optical compensating plate and the second optical compensating plate may be disposed such that fast axes in the respective normal directions thereof intersect each other at an angle other than a right angle.

According to this construction, the phase retardation of the liquid crystal layer at one substrate side in the liquid crystal panel can be compensated for by the first optical compensating plate and the phase retardation of the liquid crystal layer at the other substrate side can be compensated for by the second optical compensating plate. Further, the phase retardation in the normal direction of the liquid crystal panel can be compensated for, so that it is possible to obtain a high contrast ratio within a range of entry angle of the source light to the optical modulation device in the projection display apparatus.

The first optical compensating plate and the second optical compensating plate may be disposed at the outside of the substrate of the light-exit side of the pair of substrates.

According to this construction, since the first optical compensating plate and the second optical compensating plate are disposed apart from the light source, it is possible to reduce or suppress deterioration due to thermal influence from the light source by a distance spaced from the light source and by a light quantity reduced due to an aperture ratio of the liquid crystal display device.

One optical compensating plate of the first optical compensating plate and the second optical compensating plate may be disposed such that the fast axis thereof is parallel to an alignment control direction of the substrate corresponding to the one optical compensating plate.

According to this construction, by adjusting only the arrangement of the other optical compensating plate of the first optical compensating plate and the second optical compensating plate, it is possible to allow the fast axes of the optical compensating plates as seen in the normal direction to intersect each other at an angle other than a right angle.

The intersection angle at which the fast axis of the first optical compensating plate and the fast axis of the second optical compensating plate intersect each other may be an angle at which a projection contrast ratio of the liquid crystal display device is the maximum within a range of 91° to 110°.

According to this construction, the compensation of the phase retardation in the normal direction in the liquid crystal panel and the compensation of the phase retardation within a range of small polar angles about the normal direction can be balanced. Therefore, it is possible to obtain a high contrast ratio within a range of the entry angle of the source light to the optical modulation device in the projection display apparatus.

On the other hand, according to the exemplary embodiments, a projection display apparatus having the aforementioned liquid crystal display device as an optical modulation device is provided.

In the projection display apparatus, the entry angle of the source light to the optical modulation device is a polar angle of about 12° and the projected image is formed by the entry light. The phase retardation in the normal direction in the liquid crystal panel and the phase retardation within a range of small polar angles can be compensated for by the aforementioned liquid crystal display device, so that it is possible to discourage, reduce and/or prevent the leakage of light at the time of displaying black. Therefore, it is possible to obtain a projected image with a high contrast ratio.

DETAILED DESCRIPTION OF EMBODIMENTS

Exemplary embodiments of the present invention will be described with reference to the attached drawings. In the respective figures used for the following description, scales of respective elements are suitably varied for the purpose of easy recognition of the respective elements. In this specification, the liquid crystal layer side of the respective elements is referred to as an inner side and the opposite side is referred to as an outer side. In addition, "at the time of applying a non-selection voltage" and "at the time of applying a selection voltage" means "when the voltage applied to the liquid crystal layer is around the threshold voltage of the liquid crystal" and "when the voltage applied to the liquid crystal layer is sufficiently higher than the threshold voltage of the liquid crystal", respectively.

First Exemplary Embodiment

First, a liquid crystal display device according to a first exemplary embodiment of the present invention will be described with reference to FIGS. 1 to 8(b). The liquid crystal display device according to the first exemplary embodiment includes a liquid crystal panel in which a liquid crystal layer is interposed between a pair of substrates, optical compensating plates disposed at the outside of the liquid crystal panel, and polarizing films disposed at the outside of the optical compensating plates. In the present exemplary embodiment, a transmissive liquid crystal panel of an active matrix type employing a thin film transistor (hereinafter, referred to as a TFT) as a switching element will be exemplified.

Exemplary Equivalent Circuit

Figure 1:
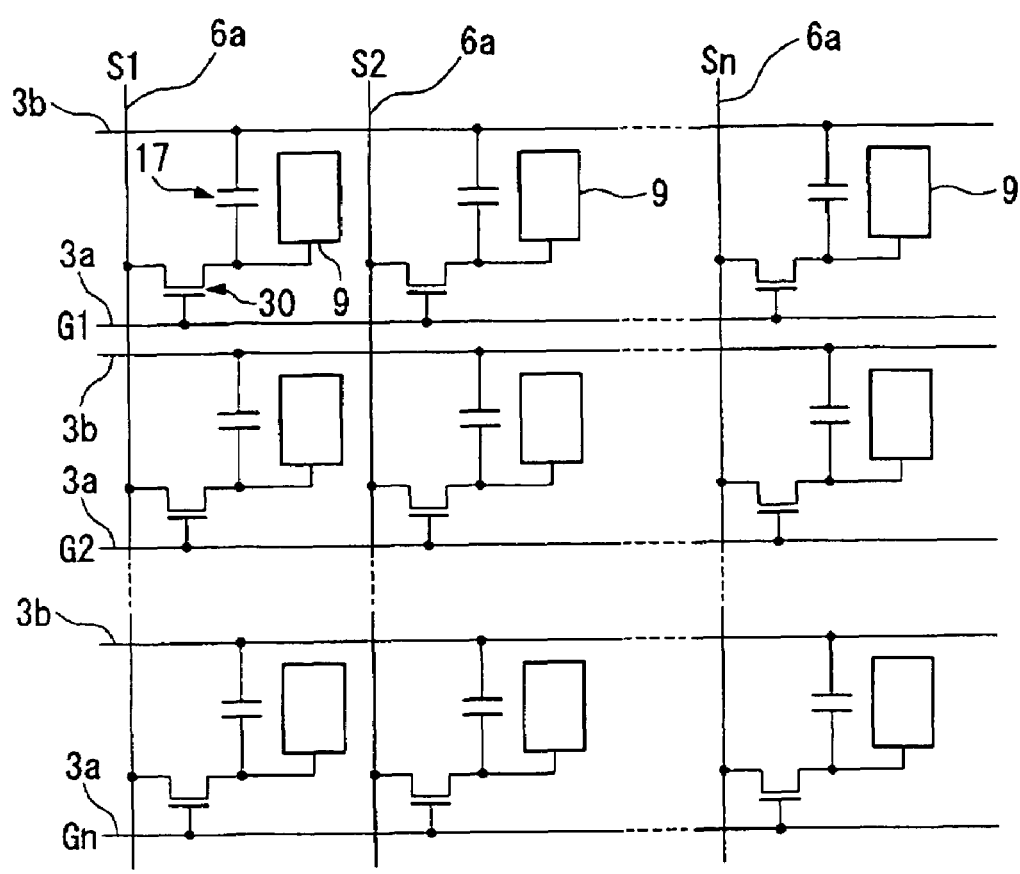
FIG. 1 is a circuit schematic illustrating an equivalent circuit of a liquid crystal panel in an exemplary embodiment of the present invention.

FIG. 1 is a circuit schematic illustrating an equivalent circuit of a liquid crystal panel. Pixel electrodes 9 are formed in a plurality of dots arranged in a matrix shape to constitute an image display area of the transmissive liquid crystal panel. TFT elements 30, as switching elements to control the electrical connection to the pixel electrodes 9, are formed at the lateral sides of the pixel electrodes 9. Data lines 6a are electrically connected to the sources of the TFT elements 30, respectively. The respective data lines 6a are supplied with the image signals S1, S2, . . . , Sn. The image signals S1, S2, . . . , Sn may be line-sequentially supplied to the data lines 6a in this order, and may be supplied to a plurality of data lines 6a adjacent to each other in a unit of groups.

Scanning lines 3a are electrically connected to the gates of the TFT elements 30, respectively. Scanning signals G1, G2, . . . , Gn are supplied in pulse-like to the scanning lines 3a at a predetermined timing. The scanning signals G1, G2, . . . , Gn are line-sequentially supplied to the scanning lines 3a in this order. The pixel electrodes 9 are electrically connected to the drains of the TFT elements 30, respectively. By turning on the TFT elements 30 as the switching elements only for a constant period using the scanning signals G1, G2, . . . , Gn supplied from the scanning lines 3a, the image signals S1, S2, . . . , Sn supplied from the data lines 6a are written to the liquid crystal of each pixel at a predetermined timing.

The image signals S1, S2, . . . , Sn of a predetermined level written to the liquid crystal are held by liquid crystal capacitors formed by the pixel electrode 9 and a common electrode to be described later for a predetermined period. In order to prevent the held image signals S1, S2, . . . , Sn from being leaked, a storage capacitor 17 is formed between the pixel electrode 9 and the capacitor line 3b, and is disposed to be parallel to the liquid crystal capacitor. In this way, by applying voltage signals to the liquid crystal, the alignment state of the liquid crystal molecules are varied in accordance with levels of the applied voltage. As a result, the light entering the liquid crystal is modulated, so that it is possible to display gray-scale display.

Exemplary Two-Dimensional Structure

Figure 2:
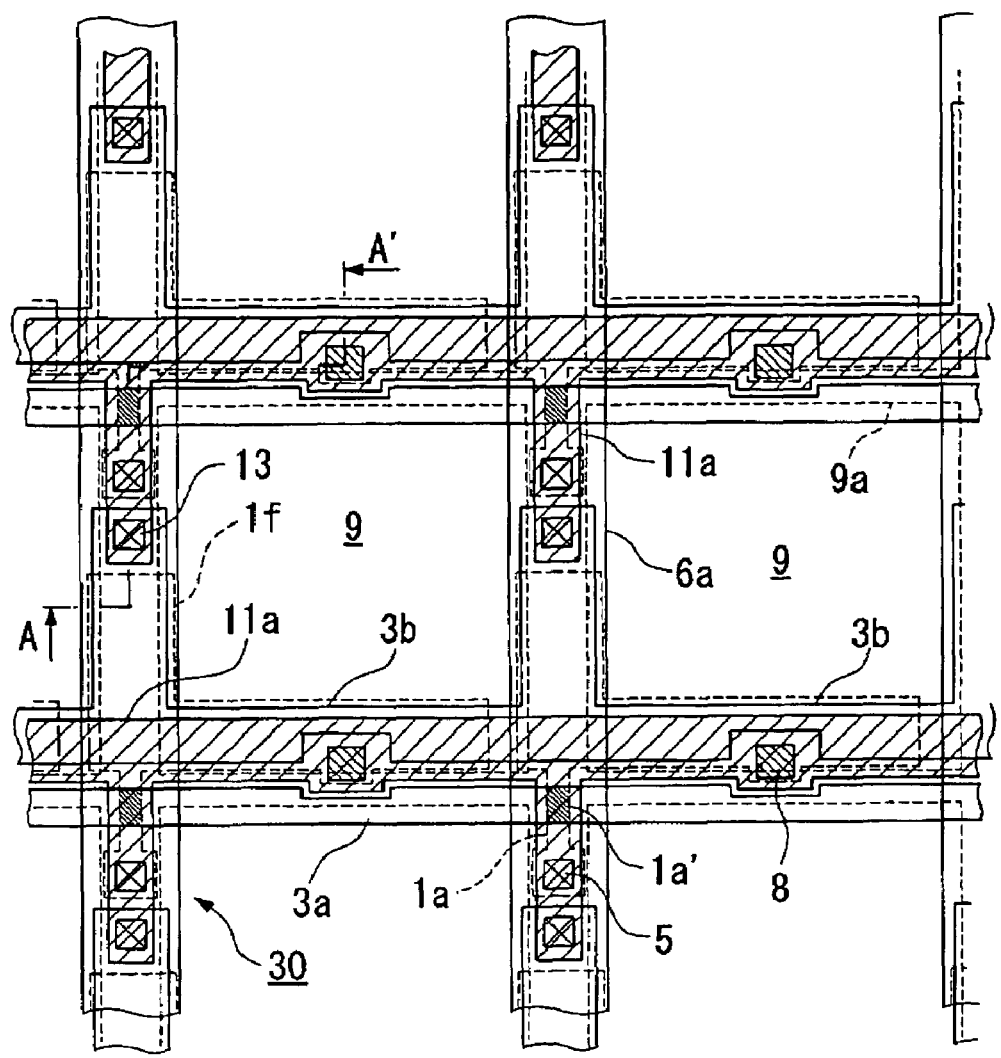
FIG. 2 is a schematic illustrating a two-dimensional structure of the liquid crystal panel in an exemplary embodiment of the present invention.

FIG. 2 is a schematic illustrating a two-dimensional structure of the liquid crystal panel. In the liquid crystal panel according to the present exemplary embodiment, the rectangular pixel electrodes 9 (of which outlines are indicated by the dotted lines 9a) made of a transparent conductive material such as indium tin oxide (hereinafter, referred to as ITO) are arranged in a matrix shape on a TFT array substrate. The data lines 6a, the scanning lines 3a, and the capacitor lines 3b are provided along the lateral and longitudinal boundaries of the pixel electrodes 9. In the present exemplary embodiment, an area in which each pixel electrode 9 is formed is a dot, and the display can be performed in a unit of dots arranged in a matrix shape.

Each TFT element 30 is formed centering a semiconductor layer 1a made of a polysilicon film, etc. The data line 6a is electrically connected to the source region (to be described later) of the semiconductor layer 1a through a contact hole 5. The pixel electrode 9 is electrically connected to the drain region (to be described later) of the semiconductor layer 1a through a contact hole 8. On the other hand, the channel region 1a' is formed in a portion opposite to the scanning line 3a in the semiconductor layer 1a. The scanning line 3a severs as a gate electrode in the portion opposite to the channel region 1a'.

Each capacitor line 3b includes a main line portion (that is, a first area formed along the scanning line 3a as seen two-dimensionally) extending approximately in a line shape along the scanning line 3a and a protruded portion (that is, a second area provided along the data line 6a as seen two-dimensionally) protruded to the front stage side (upward in the figure) along the data line 6a from the intersection with the data line 6a. In the upwardly-hatched areas of FIG. 2, a first light-shielding film 11a is formed. The protruded portion of the capacitor line 3b and the first light-shielding film 11a are electrically connected to each other through a contact hole 13, thereby forming a storage capacitor to be described later.

Exemplary Cross-Sectional Structure

Figure 3:
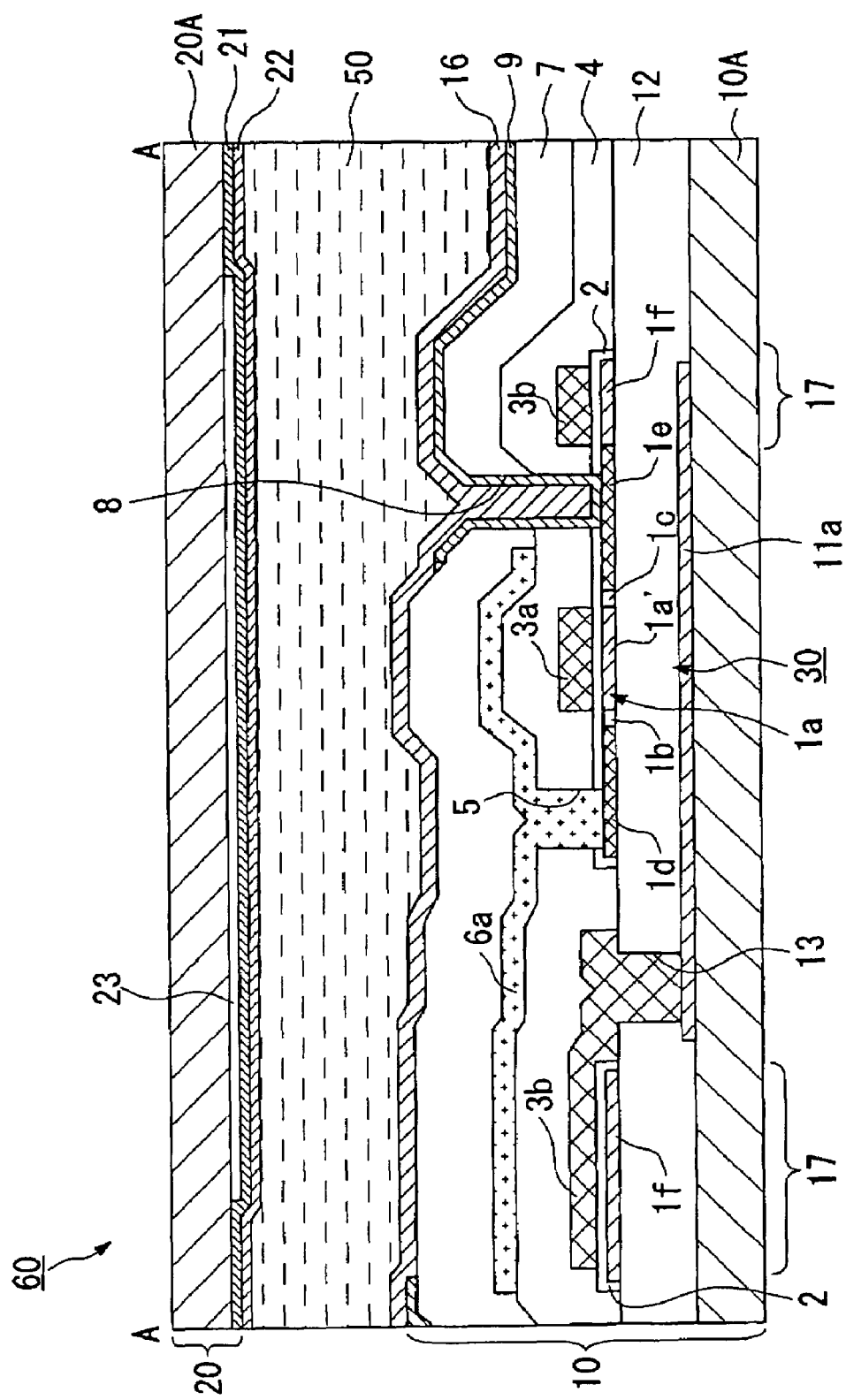
FIG. 3 is a cross-sectional schematic illustrating a sectional structure of the liquid crystal panel.

FIG. 3 is a schematic illustrating a cross-sectional structure of the liquid crystal panel and is also a side cross-sectional view taken along Line A-A' of FIG. 2. As shown in FIG. 3, the liquid crystal panel 60 according to the present exemplary embodiment includes a TFT array substrate 10, a counter substrate 20 disposed opposite to the TFT array substrate, and a liquid crystal layer 50 interposed between the substrates as major elements. The TFT array substrate 10 includes a substrate body 10A made of a light-transmitting material such as glass or quartz, TFT elements 30, pixel electrodes 9, an alignment film 16, etc. formed inside the substrate body as major elements. The counter substrate 20 includes a substrate body 20A made of a light-transmitting material such as glass or quartz, a common electrode 21, an alignment film 22, etc. formed inside the substrate body as major elements.

A first light-shielding film 11a and a first interlayer insulating film 12 to be described are formed on the surface of the TFT array substrate 10. The semiconductor layer 1a is formed on the first interlayer insulating film 12, and the TFT elements 30 are formed centering the semiconductor layer 1a. The channel regions 1a' are formed at the portions opposite to the scanning lines 3a, and the source region and the drain region are formed at both sides thereof. Since the TFT elements 30 employ an LDD (Lightly Doped Drain) structure, high-concentration regions having a relatively high concentration of impurities and low-concentration regions (LDD region) having a relative low concentration of impurities are formed in the source region and the drain region, respectively. That is, the low-concentration source region 1b and the high-concentration source region 1d are formed in the source region, and the low-concentration drain region 1c and the high-concentration drain region 1e are formed in the drain region.

A gate insulating film 2 is formed on the surface of the semiconductor layer 1a. The scanning line 3a is formed on the surface of the gate insulating film 2, and a part thereof forms a gate electrode. A second interlayer insulating film 4 is formed on the surface of the gate insulating film 2 and the scanning lines 3a. The data lines 6a are formed on the surface of the second interlayer insulating film 4, and each data line 6a is electrically connected to the high-concentration source region 1d through the contact hole 5 formed in the second interlayer insulating film 4. A third interlayer insulating film 7 is formed on the surface of the second interlayer insulating film 4 and the data lines 6a. The pixel electrodes 9 are formed on the surface of the third interlayer insulating film 7, and each pixel electrode 9 is electrically connected to the high-concentration drain region 1e through the contact hole 8 formed in the second interlayer insulating film 4 and the third interlayer insulating film 7. The alignment film 16 made of polyimide, etc. is formed to cover the pixel electrodes 9. The surface of the alignment film 16 is subjected to a rubbing process, etc., and thus can control an alignment direction of the liquid crystal molecules at the time of applying a non-selection voltage.

In the present exemplary embodiment, a first storage capacitor electrode 1f is formed to extend from the semiconductor layer 1a. In addition, a dielectric film is formed to extend from the gate insulating film 2, and the capacitor lines 3b are disposed on the surface thereof, thereby forming a second storage capacitor electrode. Accordingly, the aforementioned storage capacitor 17 is constituted.

A first light-shielding film 11a is formed on the surface of the TFT array substrate 10 corresponding to formation area of the TFT element 30. The first light-shielding film 11a prevents the light input to the liquid crystal panel from entering the channel region 1a', the low-concentration source region 1b, and the low-concentration drain region 1c of the semiconductor layer 1a. The first light-shielding film 11a is electrically connected to the capacitor line 3b at the front or rear stage through the contact hole 13 formed in the first interlayer insulating film 12. As a result, the first light-shielding film 11a serves as a third storage capacitor electrode, and a new storage capacitor is formed together with the first storage capacitor electrode 1f using the first interlayer insulating film 12 as a dielectric film.

On the other hand, a second light-shielding film 23 is formed on the surface of the counter substrate 20 corresponding to the formation areas of the data line 6a, the scanning line 3a, and the TFT element 30. The second light-shielding film 23 prevents the light input to the liquid crystal panel from entering the channel region 1a', the low-concentration source region 1b, and the low-concentration drain region 1c of the semiconductor layer 1a. The common electrode 21 made of a conductive material such as ITO is formed on substantially the entire surface of the counter substrate 20 and the second light-shielding film 23. The alignment film 22 made of polyimide, etc. is formed on the surface of the common electrode 21. The surface of the alignment film 22 is subjected to the rubbing process, etc., and thus can control the alignment direction of the liquid crystal molecules at the time of applying a non-selection voltage.

The liquid crystal layer 50 made of nematic liquid crystal is interposed between the TFT array substrate 10 and the counter substrate 20. The nematic liquid crystal molecules have a positive dielectric anisotropy, are horizontally aligned at the time of applying the non-selection voltage, and are vertically aligned at the time of applying the selection voltage. The nematic liquid crystal molecules have a positive birefringence, and a product (retardation) $\Delta n \cdot d$ of the birefringence ($\Delta n$) thereof and the thickness (d) of the liquid crystal layer is set to about 0.40 μm (60° C.). The alignment control direction by the alignment film 16 of the TFT array substrate 10 and the alignment control direction by the alignment film 22 of the counter substrate 20 are twisted to each other by about 90°, as indicated by arrows 67 and 68 in FIG. 4. As a result, the liquid crystal panel 60 according to the present exemplary embodiment operates in a twisted nematic mode.

Exemplary Polarizing Film

Figure 4:
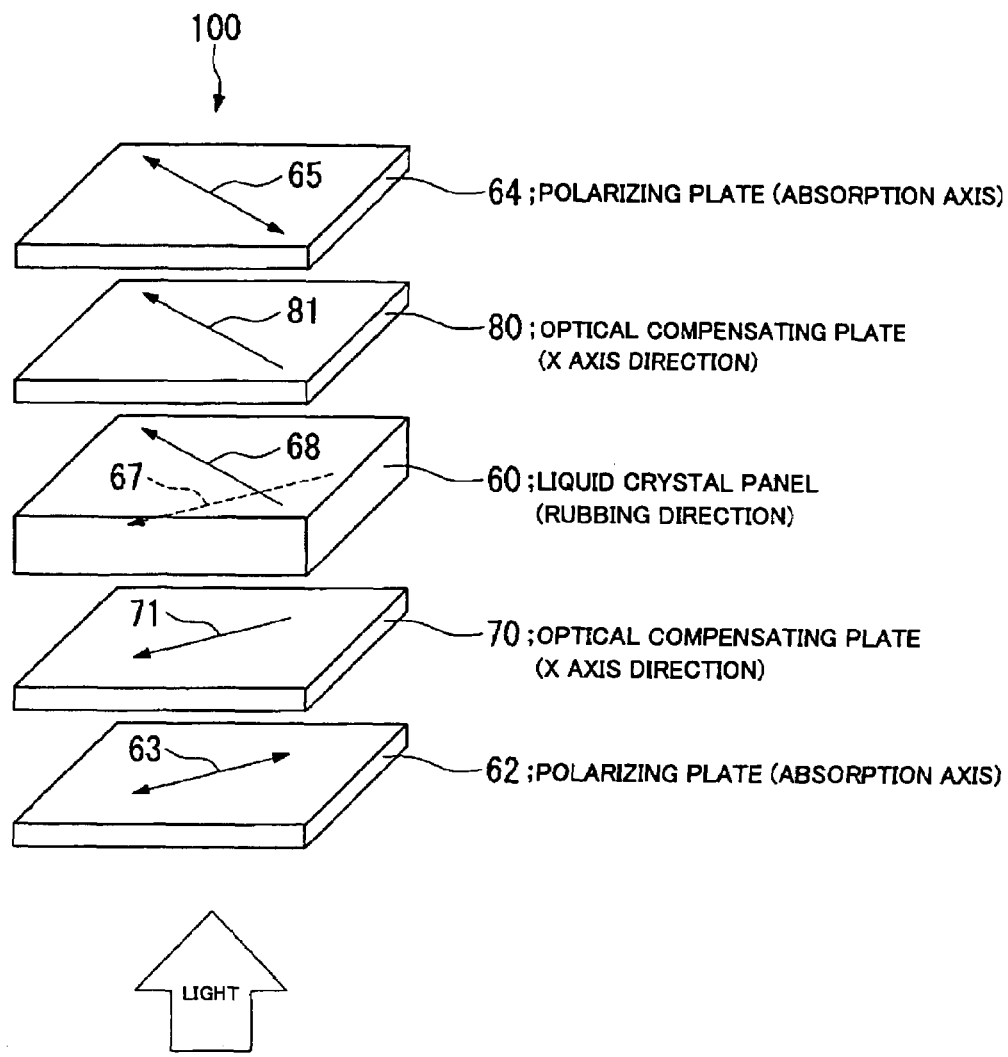
FIG. 4 is an exploded schematic illustrating a liquid crystal display device according to a first exemplary embodiment of the present invention.

FIG. 4 is an exploded perspective view of the liquid crystal display device according to the first exemplary embodiment. The liquid crystal display device 100 according to the present exemplary embodiment includes the aforementioned liquid crystal panel 60, optical compensating plates 70 and 80, and polarizing plates 62 and 64 disposed at the outside of the optical compensating plates 70 and 80. Each of the optical compensating plates 70 and 80 and the polarizing plates 62 and 64 are mounted on a support substrate 78 (see FIG. 5) made of a light-transmitting material having high thermal conductivity, such as sapphire glass or crystal, and is disposed apart from the liquid crystal panel 60.

As shown in FIG. 4, the polarizing plate 62 is disposed at the light-entry side of the liquid crystal panel 60 and the polarizing plate 64 is disposed at the light-exit side thereof. The respective polarizing plates 62 and 64 have a function of absorbing a linearly-polarized light in the absorption axis direction and transmitting the linearly-polarized light in the transmission axis direction. The respective polarizing plates 62 and 64 are disposed such that the absorption axis and the transmission axis are perpendicular to each other. The polarizing plate 64 at the light-exit side is disposed such that the absorption axis 65 or the transmission axis thereof approximately matches with the alignment control direction 68 of the alignment film on the substrate at the light-exit side of the liquid crystal panel 60. The polarizing plate 62 at the light-entry side is disposed such that the absorption axis 63 or the transmission axis thereof is approximately equal to the alignment control direction 67 of the alignment film on the substrate at the light-entry side of the liquid crystal panel 60.

When the light is input to the liquid crystal display device 100 from the downside of the polarizing plate 62, only the linearly-polarized light matching with the transmission axis of the polarizing plate 62 passes through the polarizing plate 62. In the liquid crystal panel 60 at the time of applying the non-selection voltage, the liquid crystal molecules are horizontally aligned in a spiral shape. Accordingly, the linearly-polarized light input to the liquid crystal panel 60 is rotated by about 90° and then exits from the liquid crystal panel 60. Since the linearly-polarized light matches with the transmission axis of the polarizing plate 64, the linearly-polarized light passes through the polarizing plate 64. Therefore, in the liquid crystal panel 60 at the time of applying the non-selection voltage, white is displayed (normally white mode). In the liquid crystal panel at the time of applying the selection voltage, the liquid crystal molecules are vertically aligned (see FIG. 6). Accordingly, the linearly-polarized light input to the liquid crystal panel 60 is not rotated, and then exits from the liquid crystal panel 60. Since the linearly-polarized light is perpendicular to the transmission axis of the polarizing plate 64, the linearly-polarized light does not pass through the polarizing plate 64. Therefore, in the liquid crystal panel 60 at the time of applying the selection voltage, black is displayed.

Optical Compensating Plate

In the present exemplary embodiment, the first optical compensating plate 70 is disposed at the outside of the substrate at the light-entry side of the liquid crystal panel 60, and the second optical compensating plate 80 is disposed at the outside of the substrate at the light-exit side.

Figure 5:
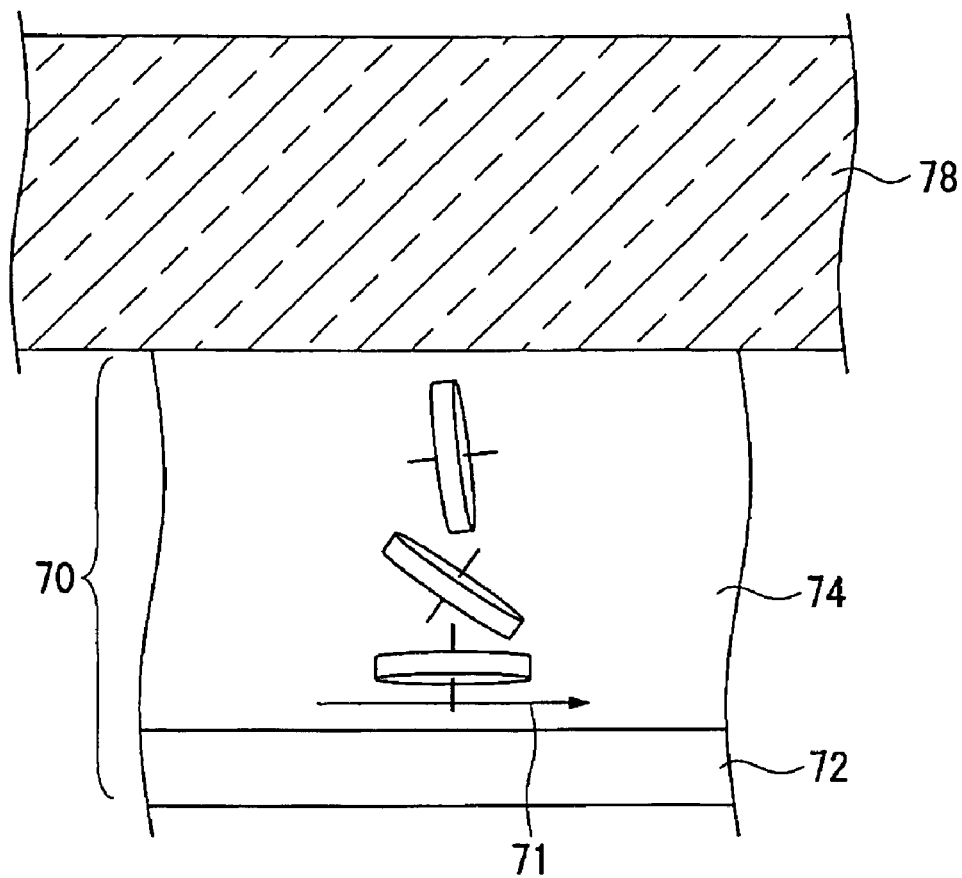
FIG. 5 is a side cross-sectional schematic illustrating an optical compensating plate in an exemplary embodiment of the present invention.

FIG. 5 is a side cross-sectional view of the optical compensating plate. The first optical compensating plate 70 is obtained by providing an alignment film (not shown) on a support member 72 made of tri-acetyl cellulose (TAC), etc. and then forming a discotic compound layer 74 made of tri-phenylene derivative, etc. on the alignment film. The alignment film is made of polyvinyl alcohol (PVA), etc. and the surface thereof is subjected to the rubbing process, etc., thereby controlling the alignment direction of the liquid crystal molecules. On the other hand, the discotic compound layer 74 has an optical structure in which the tilt angle of the optical axis of a refractive-index ellipsoid having a negative single-axial property continuously varies in the thickness direction. Such a hybrid alignment structure can be obtained by coating a liquid-crystal discotic compound on the support member 72 and aligning and curing it at a predetermined temperature. The discotic compound has a tilt angle of 0° to 15° at the support member 72 side, and has a tilt angle of 20° to 60° at the opposite side. The alignment control direction 71 of the discotic liquid crystal is defined as the X axis direction. The X axis direction is a fast axis direction of the optical compensating plate as seen in the normal direction thereof. As such, a first optical compensating plate 70, for example, a WV film manufactured by Fuji Photo Film Co., LTD., may be employed. The second optical compensating plate is obtained similarly to the aforementioned first optical compensating plate 70.

Figure 6:
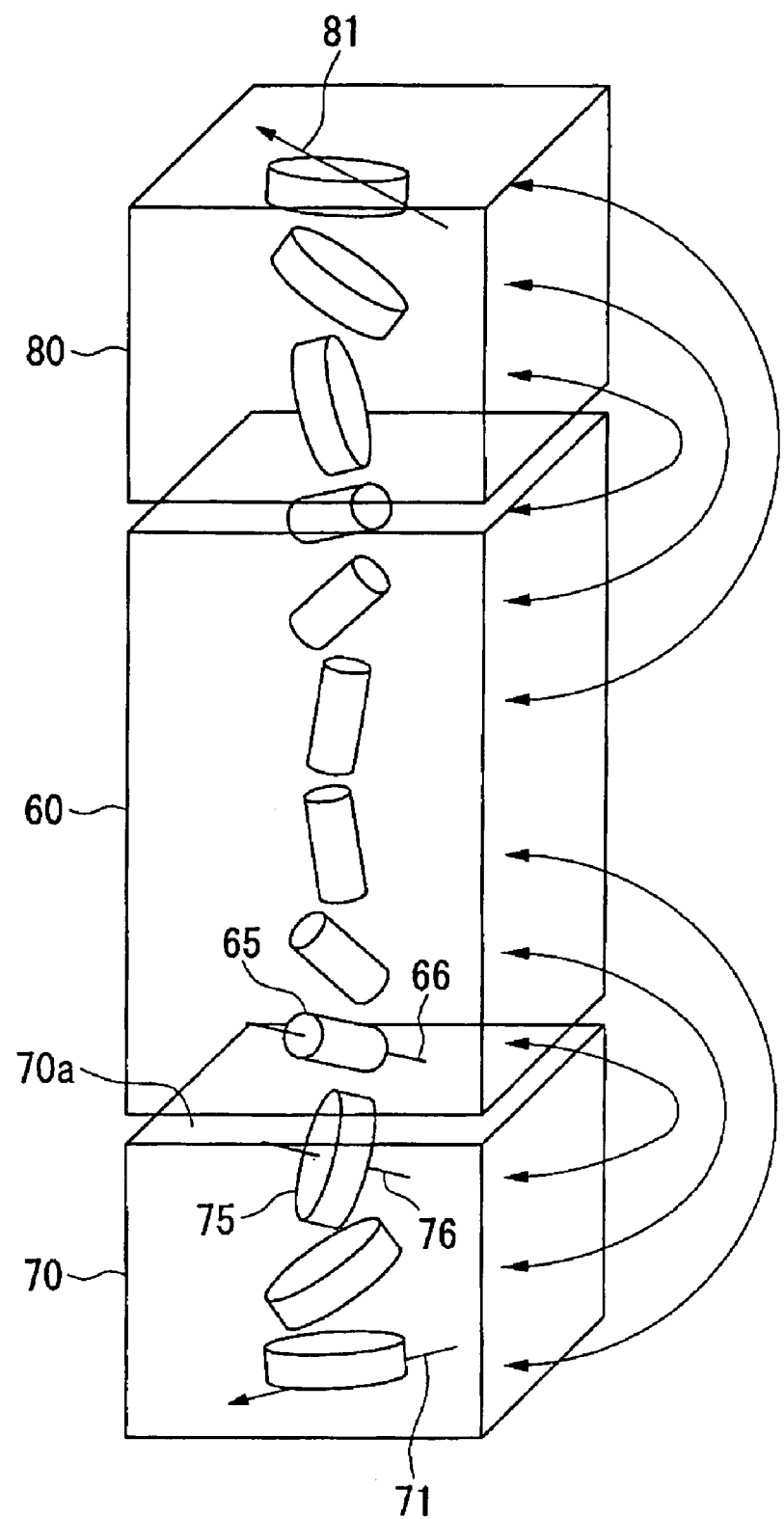
FIG. 6 is a schematic illustrating the optical compensation in an exemplary embodiment of the present invention.

FIG. 6 is a schematic illustrating the optical compensation. The nematic liquid crystal sealed in the liquid crystal panel 60 has optically a positive single-axial property. That is, since the refractive index in the optical axis direction 66 is larger than the refractive indexes in other directions, the refractive-index ellipsoid has a rugby ball shape. When the selection voltage is applied to the nematic liquid crystal of the liquid crystal panel 60, the liquid crystal molecules are vertically aligned from the center in the thickness direction of the liquid crystal layer to the end portions. Here, the refractive-index ellipsoid having a rugby ball shape is elliptical as observed in the tilted direction and the difference between the major axis and the minor axis is birefringence. The phase retardation as observed in the tilted direction causes the leakage of light at the time of displaying black and the contrast ratio of the liquid crystal panel, thereby deteriorating the viewing angle characteristic.

On the contrary, the discotic liquid crystal constituting the first optical compensating plate 70 has optically a negative single-axial property. That is, since the refractive index in the optical axis direction 76 is smaller than the refractive indexes in other directions, the refractive-index ellipsoid has a disk shape. Here, by disposing the optical axis 76 of the refractive-index ellipsoid 75 having a disk shape in the first optical compensating plate 70 to be parallel to the optical axis 66 of the refractive-index ellipsoid 65 having the rugby ball shape in the liquid crystal panel 60, it is possible to cancel the birefringence effect of the refractive-index ellipsoid 65. Therefore, as shown in FIG. 4, the first optical compensating plate 70 is disposed such that the alignment control direction 71 of the alignment film in the first optical compensating plate 70 approximately matches with the alignment control direction 67 of the alignment film in the liquid crystal panel 60. In addition, as shown in FIG. 6, the first optical compensating plate 70 is disposed such that the surface (that is, the surface in which the liquid crystal molecules 75 are vertically aligned) 70a in which the optical axis 76 of the liquid crystal molecules 75 in the first optical compensating plate 70 and the normal line of the first optical compensating plate 70 form a larger angle is opposite to the liquid crystal panel 60. As a result, as indicated by an arrow in FIG. 6, the optical axis of the negative refractive-index ellipsoid constituting the first optical compensating plate 70 is parallel to the optical axis of the positive refractive-index ellipsoid constituting the liquid crystal panel 60. Accordingly, it is possible to almost completely compensate for the phase retardation as observed in all directions. Therefore, the leakage of light at the time of displaying black can be prevented, and thus the contrast ratio of the liquid crystal panel can be enhanced, thereby improving the viewing angle characteristic.

When the selection voltage is applied to the nematic liquid crystal of the liquid crystal panel 60, the liquid crystal molecules around the center of the liquid crystal layer are vertically aligned, but the liquid crystal molecules around the alignment film are strongly anchored and thus are not completely vertically aligned. As a result, the liquid crystal panel 60 at the time of applying the selection voltage has a slight phase retardation even as observed in the normal direction. This phase retardation causes the leakage of light at the time of displaying black, thereby deteriorating the contrast ratio in the normal direction of the liquid crystal panel 60.

On the other hand, the discotic liquid crystal molecules of the respective optical compensating plates 70 and 80 are in a hybrid alignment state in which the tilt angle of the optical axis of the refractive-index ellipsoid continuously varies in the thickness direction. Due to this hybrid alignment, the respective optical compensating plates 70 and 80 have a slow axis and a fast axis as seen in the normal direction thereof. That is, the alignment control direction 71 and 81 (X axis direction) of the alignment film of the respective optical compensating plates 70 and 80 is the fast axis and the direction perpendicular to the alignment control direction 71 and 81 is the slow axis. As a result, the optical compensating plates have the phase retardation in the normal direction thereof. Therefore, the phase retardation in the normal direction of the liquid crystal panel 60 can be compensated for by the phase retardation in the normal direction of the respective optical compensating plates 70 and 80.

Figure 7:
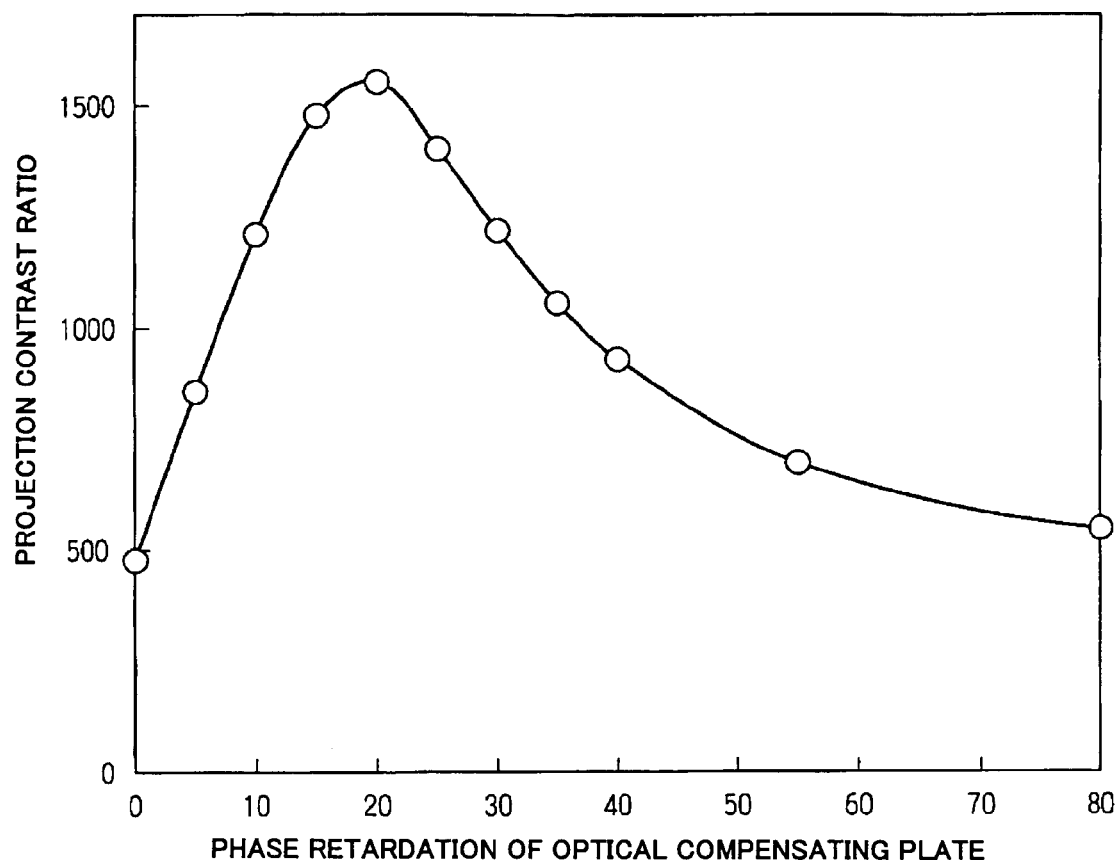
FIG. 7 is a graph showing a relation between a phase retardation of the optical compensating plate and a projection contrast ratio in an exemplary embodiment of the present invention.
Figure 8:
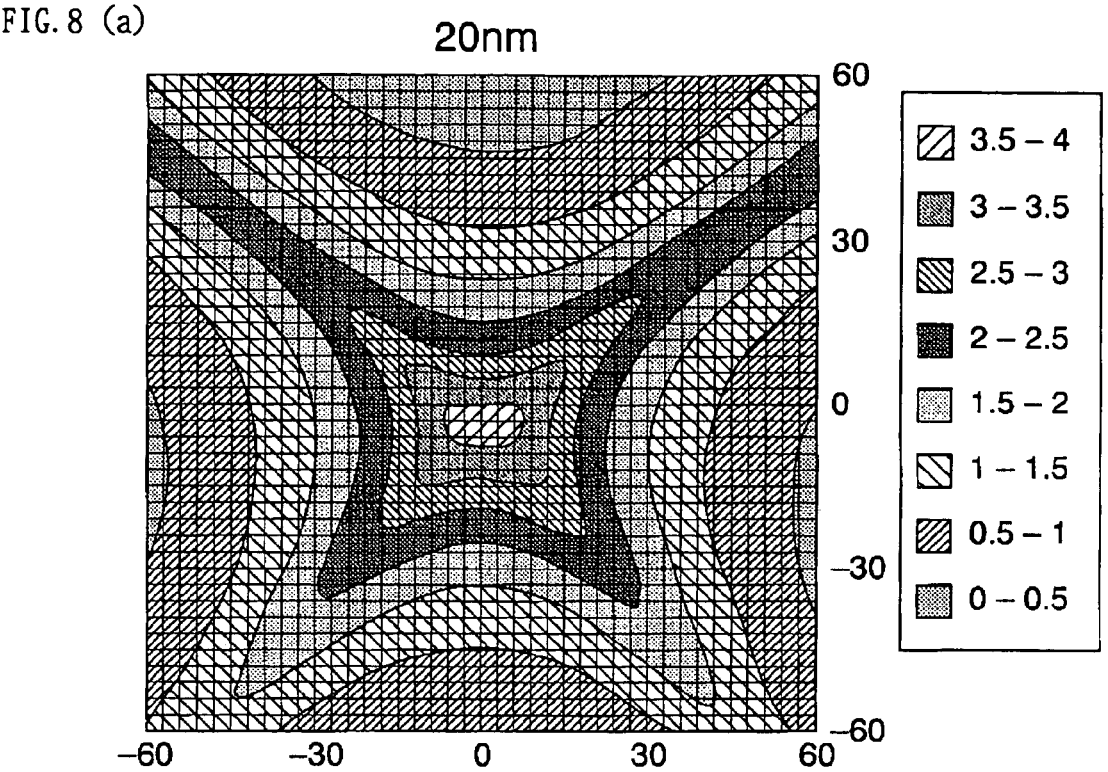
FIGS. 8(a) and 8(b) are curve schematics illustrating equivalent contrast ratios of the liquid crystal display device in an exemplary embodiment of the present invention.
Figure 8:
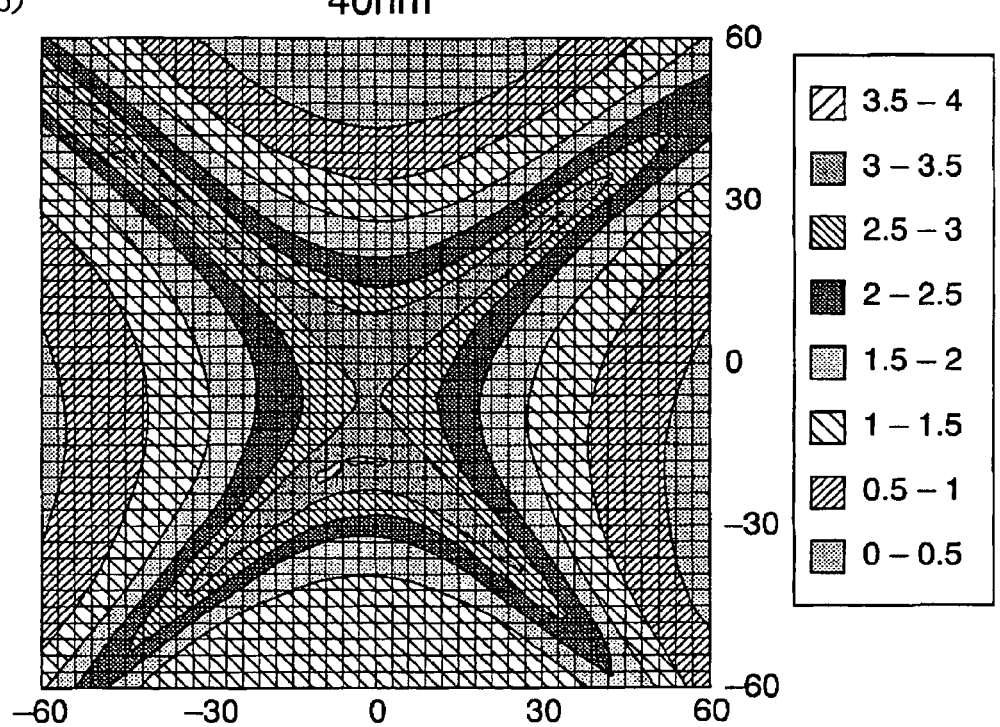

FIG. 7 is a graph illustrating a relation between the phase retardation of the optical compensating plate and the projection contrast ratio. The contrast ratio of a projected image by the projection display apparatus is calculated while changing the phase retardation in the normal direction of the respective optical compensating plates. In FIG. 7, by changing the thickness of the respective optical compensating plates, the phase difference (retardation) in the normal direction of the respective optical compensating plates is changed from 5 to 80 nm. The light applied to the liquid crystal panel is equivalent to the light from q light source used for q related art projection display apparatus, has the maximum intensity in the normal direction of the liquid crystal panel, and has been spread such that the intensity is reduced into $\frac{1}{10}$ at a polar angle of 12°.

When the fast axis directions of the first optical compensating plate and the second optical compensating plate are perpendicular to each other, the phase retardation in the normal direction thereof is canceled, so that the phase retardation in the normal direction of the optical compensating plate is 0 as a whole. As a result, the phase retardation in the normal direction of the liquid crystal panel cannot be compensated for. Therefore, in the first optical compensating plate and the second optical compensating plate set to various phase retardations, by making the fast axis directions thereof intersect each other at an angle other than a right angle, the phase retardation in the normal direction of the optical compensating plates is made to occur as a whole. Specifically, as shown in FIG. 4, when the absorption axial angle of the polarizing plate 62 at the light-entry side is set to 0°, the fast axis direction (alignment control direction) 71 of the first optical compensating plate 70 is set to 0°, the alignment control direction 67 of the substrate at the light-entry side in the liquid crystal panel 60 is set to 0°, the alignment control direction 68 of the substrate at the light-exit side is set to 90°, the absorption axial angle of the polarizing plate 64 at the light-exit side is set to 90°, and the fast axis direction (alignment control direction) 81 of the second optical compensating plate 80 is varied within a range of 91° to 110°. When the fast axis direction 81 of the second optical compensating plate 80 is set to be different from the alignment control direction 68 of the substrate at the light-exit side in the liquid crystal panel 60, there is a possibility of incomplete compensation of the phase retardation when the liquid crystal panel 60 is observed in the tilted direction. Therefore, the fast axis direction 81 of the second optical compensating plate 80 is disposed at the angle where the contrast ratio of an image projected by the projection display apparatus is in maximum. As a result, the compensation of the phase retardation in the normal direction of the liquid crystal panel and the compensation of the phase retardation within a range where the polar angle from the normal direction is small can be balanced.

As shown in FIG. 7, when no optical compensating plate exists (that is, when the phase retardation in the normal direction of the optical compensating plate is 0), the projection contrast ratio is 480. When a related art optical compensating plate having the phase retardation of 40 nm in the normal direction of the respective optical compensating plates is used, the projection contrast ratio is 930. On the contrary, when the phase retardation of the normal direction of the respective optical compensating plates is set at 10 through 30 nm, the projection contrast ratio exceeds 1200. Specifically, when the phase retardation in the normal direction of the respective optical compensating plates is 20 nm, the projection contrast ratio is greater than 1500. When the phase retardation in the normal direction of the respective optical compensating plates is about 10 nm, 20 nm, 30 nm, and 40 nm, respectively, the fast axial angle of the second optical compensating plate capable of optimizing the projection contrast ratio is about 103.5°, 97.2°, 95.6°, and 95.5°, respectively.

FIGS. 8(a) and 8(b) illustrate curves of equivalent contrast ratios of the liquid crystal display device, FIG. 8(a) illustrates a case where the phase retardation in the normal direction of the respective optical compensating plates is 20 nm, and FIG. 8(b) illustrates a case where the phase retardation in the normal direction of the respective optical compensating plates is 40 nm. The horizontal axis and the vertical axis in the figures denote a polar angle about the normal direction of the liquid crystal panel, respectively, and the contrast ratios are expressed by a common logarithm. Comparing the case where the phase retardation in the normal direction of the respective optical compensating plates is 20 nm with the case where the phase retardation thereof is 40 nm, it can be seen that the case of 40 nm is wider in viewing angle (for example, the area where the contrast ratio is greater than $10^2$ is larger), but the case of 20 nm has a higher contrast ratio within a range of polar angle of 12°. As described above, the entry angle of the source light to the optical modulation device of the projection display apparatus is at most a polar angle of 12°, and the projected image is formed by the entry light. Therefore, the projection contrast ratio (1560) of the projection display apparatus employing the liquid crystal panel in which the phase retardation in the normal direction of the respective optical compensating plates is 20 nm is greater than the projection contrast ratio (930) of the projection display apparatus employing the liquid crystal panel in which the phase retardation is 40 nm.

In the present exemplary embodiment, the phase retardation in the normal direction of the respective optical compensating plates is set to about 10 nm or more and about 30 nm or less. According to this construction, the phase retardations in the normal direction of the liquid crystal panel and within a range of small polar angles can be compensated for by the respective optical compensating plates. Accordingly, the leakage of light at the time of displaying black can be reduced or prevented, so that the contrast ratio in the normal direction of the liquid crystal panel and within a range of small polar angles can be enhanced. The entry angle of the source light to the optical modulation device of the projection display apparatus is at most a polar angle of about 12°, and the entry light forms the projected image. Therefore, by constructing the projection display apparatus using the liquid crystal display device according to the present embodiment, it is possible to enhance the contrast ratio of a projected image.

Second Exemplary Embodiment

Figure 9:
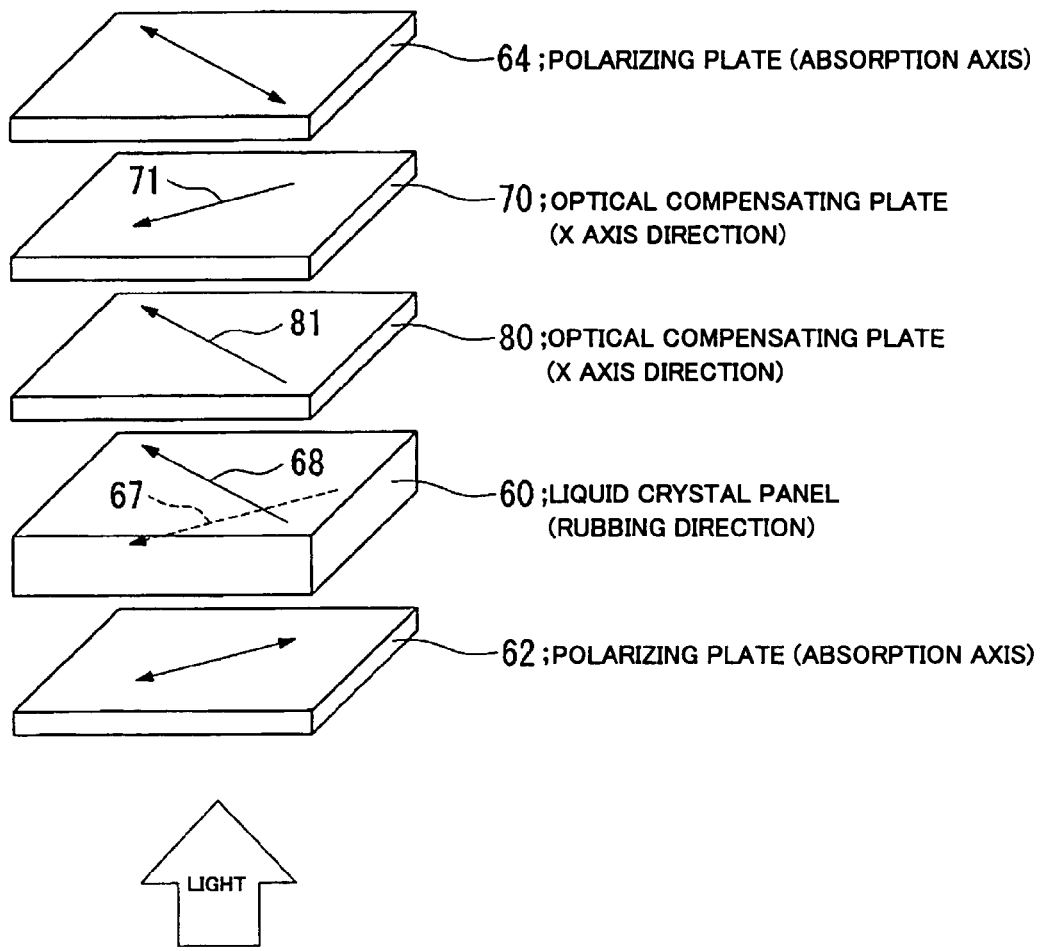
FIG. 9 is an exploded schematic illustrating a liquid crystal display device according to a second exemplary embodiment of the present invention.

Next, a liquid crystal display device according to a second exemplary embodiment of the present invention will be described with reference to FIGS. 9 to 11. In the liquid crystal display device according to the first exemplary embodiment shown in FIG. 4, the first optical compensating plate 70 and the second optical compensating plate 80 are disposed at both sides of the liquid crystal panel 60. On the contrary, the second exemplary embodiment shown in FIG. 9 is different from the first exemplary embodiment in that the first optical compensating plate 70 and the second optical compensating plate 80 are disposed only at the light-exit side of the liquid crystal panel 60. The elements similar to those of the first exemplary embodiment will be not described.

FIG. 9 is an exploded perspective view illustrating the liquid crystal display device according to the second exemplary embodiment. In the second exemplary embodiment, the second optical compensating plate 80 is disposed at the outside of the substrate at the light-exit side in the liquid crystal panel 60, and the first optical compensating plate 70 is disposed at the outside of the second optical compensating plate 80. The alignment control direction 81 of the alignment film in the second optical compensating plate 80 is disposed to approximately match with the alignment control direction 68 of the alignment film in the substrate at the light-exit side of the liquid crystal panel 60. On the contrary, the alignment control direction 71 in the first optical compensating plate 70 is optimized at the angle where the contrast ratio of the image projected by the projection display apparatus is in maximum. Specifically, when the absorption axial angle of the polarizing plate 62 at the light-entry side is set to 0°, the alignment control direction 67 in the liquid crystal panel 60 is set to 0°, the alignment control direction 68 of the substrate at the light-exit side is set to 90°, the fast axis direction (alignment control direction) 71 of the second optical compensating plate 80 is set to 90°, the absorption axial angle of the polarizing plate 64 at the light-exit side is set to 90°, and the fast axis direction (alignment control direction) 71 of the first optical compensating plate 70 is varied within a range of −20° to −1°. The fast axis direction 71 of the first optical compensating plate 70 is disposed at the angle where the contrast ratio of the image projected by the projection display apparatus is in maximum.

Figure 10:
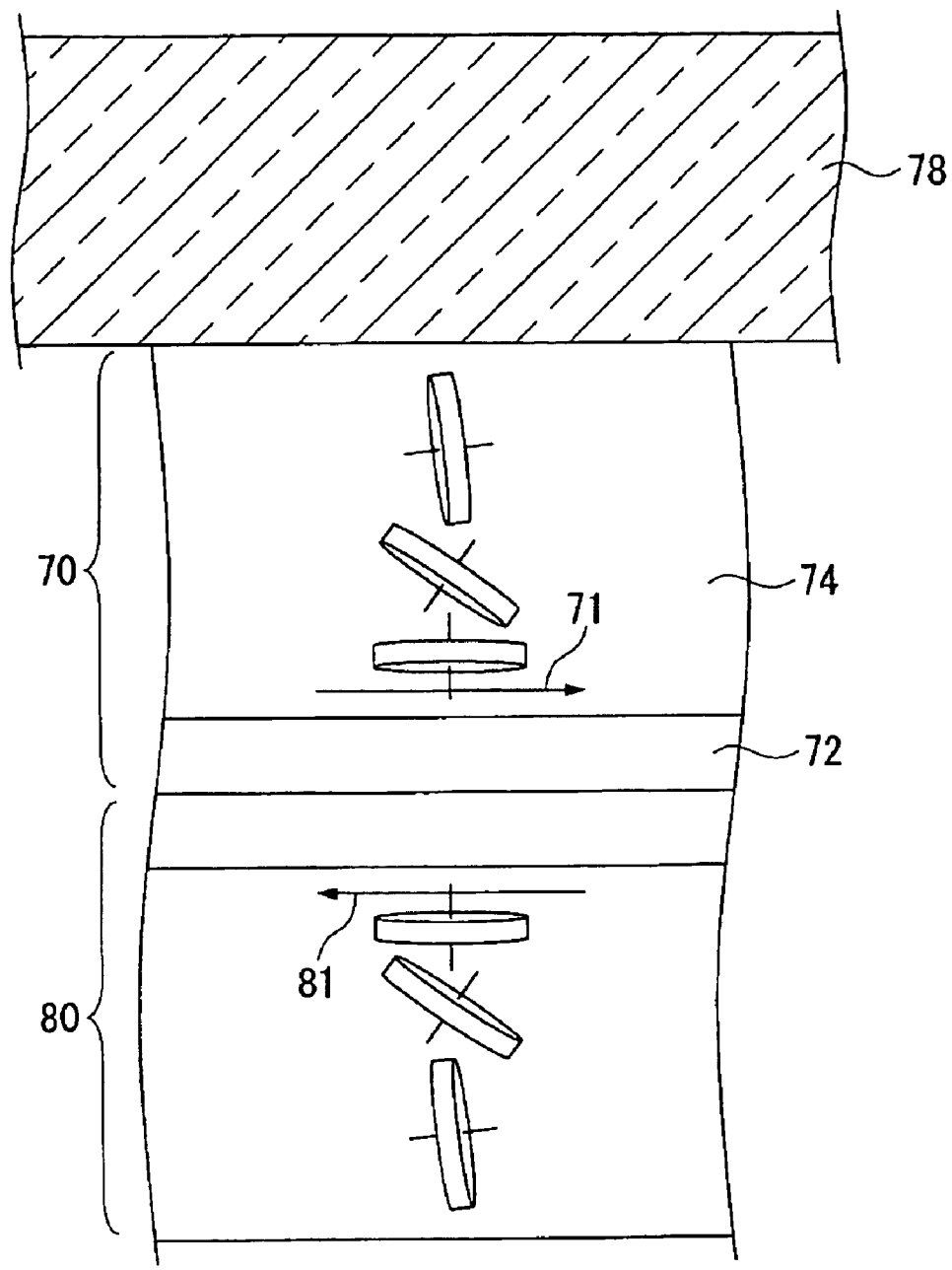
FIG. 10 is a side cross-sectional schematic illustrating a stacked optical compensating plate in an exemplary embodiment of the present invention.

FIG. 10 is a side cross-sectional view of the stacked optical compensating plate. In the second exemplary embodiment, the first optical compensating plate 70 is mounted on the surface of the support substrate 78 and the second optical compensating plate 80 is disposed on the surface of the first optical compensating plate 70. In this way, the first optical compensating plate 70 and the second optical compensating plate 80 are provided in the liquid crystal display device in a state where the optical compensating plates are mounted on one support substrate 78.

Figure 11:
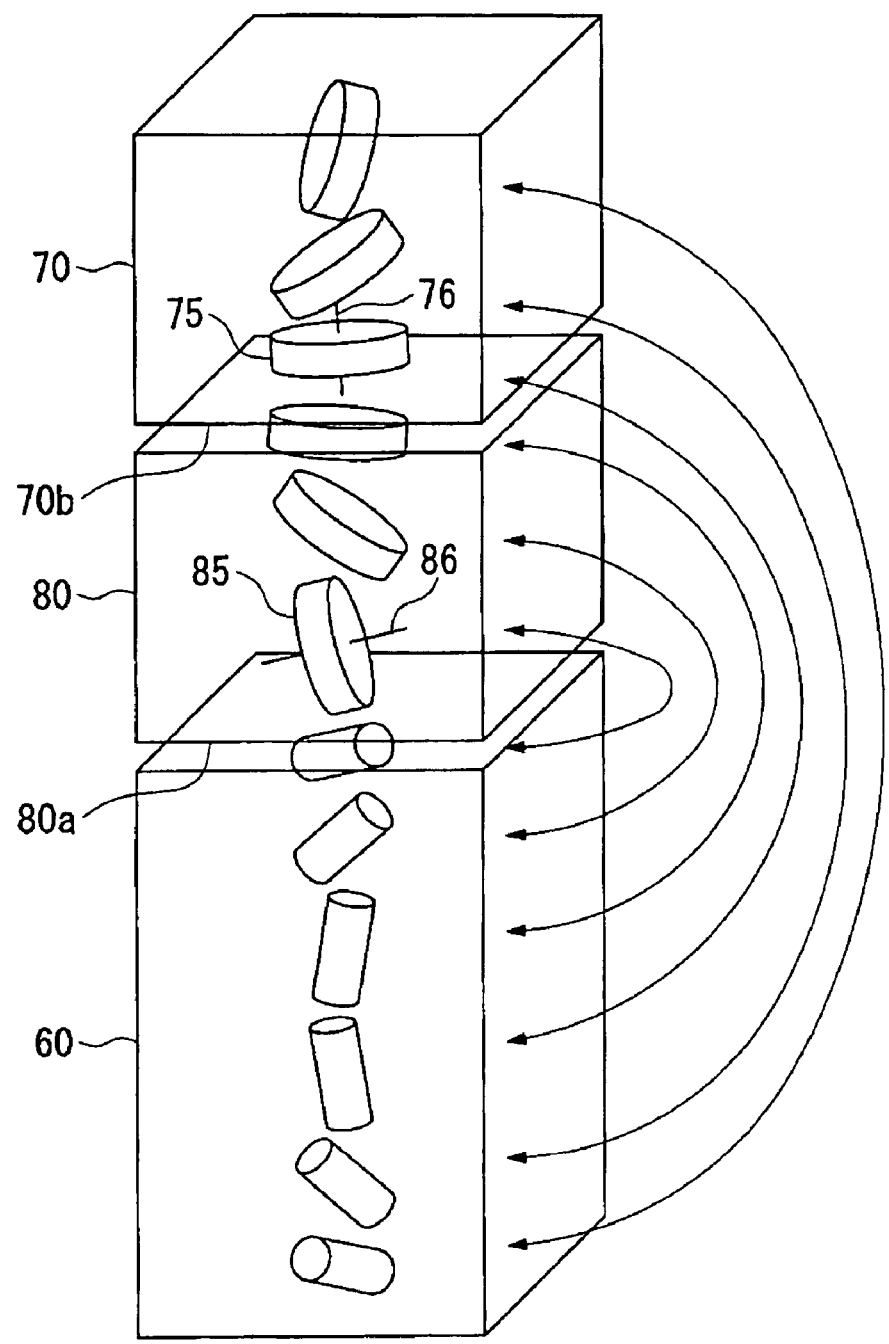
FIG. 11 is an explanatory schematic illustrating the optical compensation in an exemplary embodiment of the present invention.

FIG. 11 is an explanatory diagram illustrating the optical compensation. The second optical compensating plate 80 is disposed such that the surface 80a in which the optical axis 86 of the liquid crystal molecules 85 and the normal line of the second optical compensating plate 80 form a larger angle is opposite to the liquid crystal panel 60. The first optical compensating plate 70 is disposed such that the surface 70b in which the optical axis 76 of the liquid crystal molecules 75 and the normal line of the first optical compensating plate 70 form a smaller angle is opposite to the second optical compensating plate 80.

As described above, the first optical compensating plate 70 having been disposed at the light-entry side of the liquid crystal panel 60 in the first exemplary embodiment shown in FIG. 4 is moved in parallel toward the light-exit side of the second optical compensating plate 80 in the second exemplary embodiment shown in FIG. 11. Therefore, as indicated by an arrow in FIG. 11, the optical axis of the refractive-index ellipsoids constituting the first optical compensating plate 70 and the second optical compensating plate 80 is disposed to be parallel to the optical axis of the refractive-index ellipsoids constituting the liquid crystal panel 60.

By varying the thickness of the respective optical compensating plates 70 and 80, the phase difference (retardation) in the normal direction of the respective optical compensating plates 70 and 80 is varied up to 5 through 80 nm. As a result, the relation between the phase retardation in the normal direction of the respective optical compensating plates 70 and 80 and the projection contrast ratio shows a tendency similar to the first exemplary embodiment shown in FIG. 7. That is, the projection contrast ratio when no optical compensating plate exists is 480 and the projection contrast ratio when the phase retardation in the normal direction of the respective optical compensating plates is about 40 nm is about 1010. On the contrary, when the phase retardation in the normal direction of the respective optical compensating plates is set to about 10 through 30 nm, the projection contrast ratio exceeds 1200, and specifically, when the phase retardation in the normal direction of the respective optical compensating plates is about 20 nm, the projection contrast ratio becomes about 1600. In addition, when the phase retardation in the normal direction of the respective optical compensating plates is about 10 nm, 20 nm, 30 nm, and 40 nm, respectively, the fast axial angle of the first optical compensating plate capable of optimizing the projection contrast ratio is $-23°$, $-10.4°$, $-8°$, and $-7°$, respectively.

In this way, similarly to the first exemplary embodiment, also in the second exemplary embodiment, the phase retardation in the normal direction of the liquid crystal panel and within a range of small polar angles can be compensated for by the respective optical compensating plates. Accordingly, the leakage of light at the time of displaying black can be prevented, so that it is possible to enhance the contrast ratio in the normal direction of the liquid crystal panel and within a range of small polar angles. By constituting the projection display apparatus using the liquid crystal display device according to the second exemplary embodiment, it is possible to improve or enhance the contrast ratio of a projected image.

In the second exemplary embodiment, as shown in FIG. 10, since the first optical compensating plate 70 and the second optical compensating plate 80 are provided in the liquid crystal display device in a state where the optical compensating plates are mounted on one support substrate 78, it is possible to reduce the number of used support substrates 78. The support substrate 78 is made of a light-transmitting material having a large thermal conductivity, such as sapphire glass or alkali-free glass, the sapphire has a large phase retardation and the alkali-free glass generates a phase retardation due to heat. However, in the second exemplary embodiment, since the number of used support substrates 78 can be reduced, it is possible to decrease influence of the phase retardation of the support substrate 78. The aforementioned projection contrast ratio is greater than the first exemplary embodiment as a whole, for example, because the influence of the phase retardation of the support substrate 78 is decreased. Accordingly, the leakage of light at the time of displaying black can be reduced or decreased, thereby improving or enhancing the contrast ratio of the liquid crystal display device. It is also possible to reduce or diminish the attenuation of light due to the support substrate 78, thereby securing the brightness of the exit light. It is also possible to save space, thereby reducing manufacturing cost for the liquid crystal display device.

In the second exemplary embodiment, as shown in FIG. 9, since the first optical compensating plate 70 and the second optical compensating plate 80 are disposed only at the light-exit side of the liquid crystal panel 60, the first optical compensating plate 70 and the second optical compensating plate 80 are disposed apart from the light source (not shown) and the quantity of light is reduced due to the liquid crystal panel, so that it is difficult to have an influence from heat. Therefore, it is possible to further reduce or suppress the thermal deterioration of the first optical compensating plate 70 and the second optical compensating plate 80, compared with the first exemplary embodiment.

Exemplary Projection Display Apparatus

Figure 12:
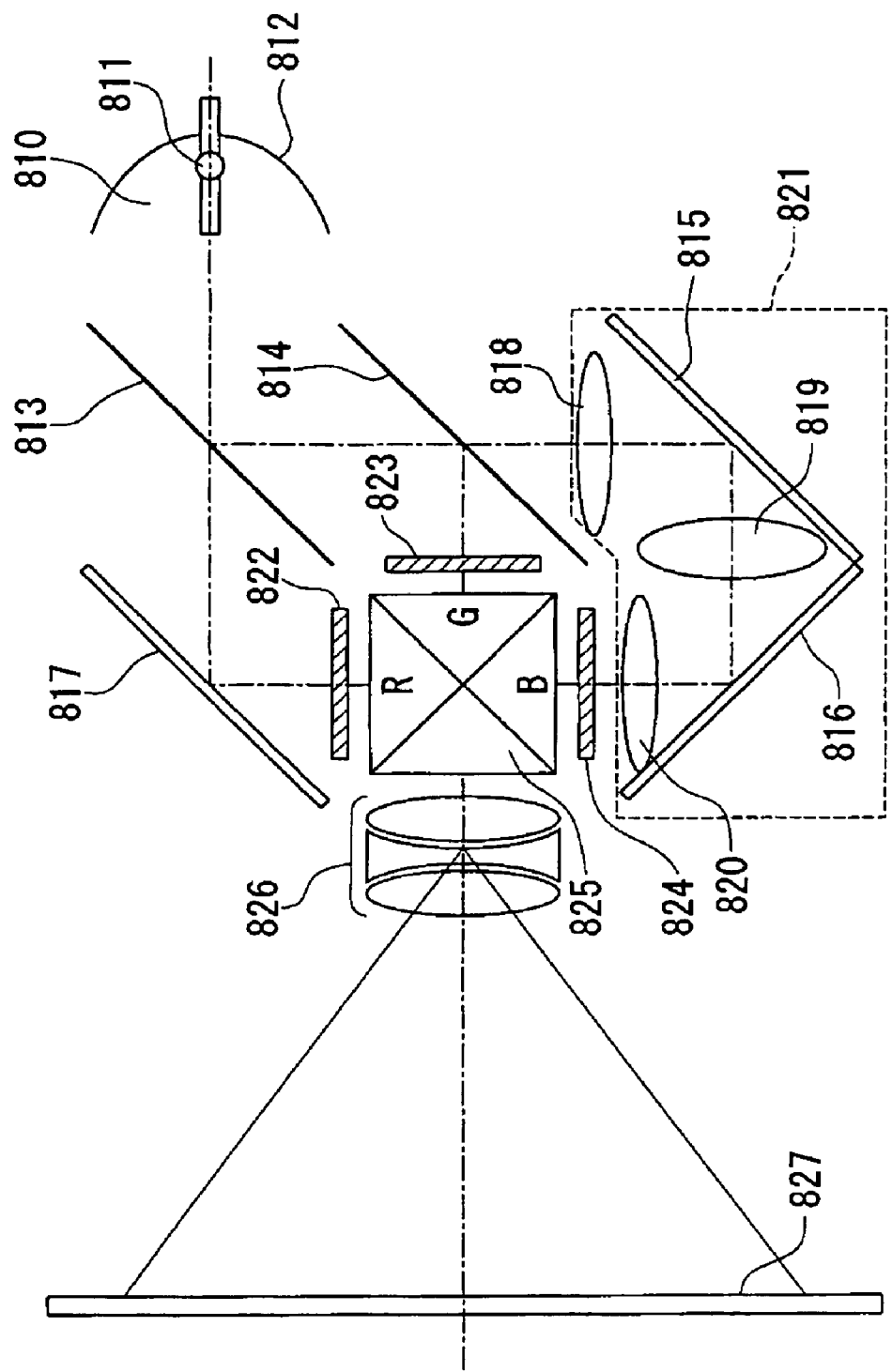
FIG. 12 is a schematic illustrating a main part of a projection display apparatus in an exemplary embodiment of the present invention.
Figure 13:
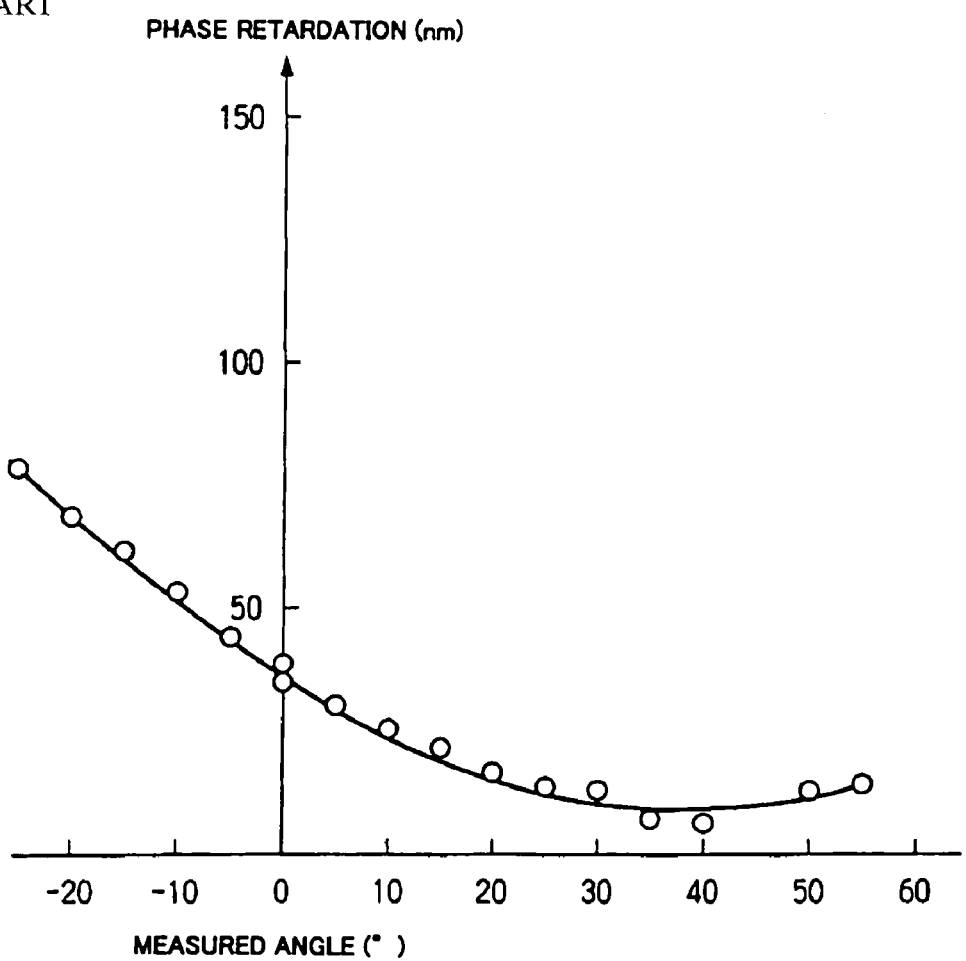
FIG. 13 is a graph illustrating viewing-angle dependency of the phase retardation of the optical compensating plate in the prior art.

Next, a projection display apparatus which is a specific example of an electronic apparatus according to the exemplary embodiments will be described with reference to FIG. 12. FIG. 12 is a schematic illustrating a main part of the projection display apparatus. The projection display apparatus includes the liquid crystal display device according to the aforementioned embodiments as an optical modulation device.

In FIG. 12, a reference numeral 810 denotes a light source, reference numerals 813 and 814 denote a dichroic mirror, reference numerals 815, 816, and 817 denote a reflective mirror, a reference numeral 818 denotes an entry lens, a reference numeral 819 denotes a relay lens, a reference numeral 820 denotes an exit lens, reference numerals 822, 823, and 824 denote an optical modulation device which are the liquid crystal display devices according to the exemplary embodiments of the present invention, a reference numeral 825 denotes a cross dichroic prism, and a reference numeral 826 denotes a projection lens. The light source 810 includes a lamp 811 such as a metal halide lamp, and a reflector 812 reflecting light from the lamp.

The dichroic mirror 813 transmits a red light component included in white light from the light source 810 and reflects a blue light component and a green light component. The transmitted red light component is reflected by the reflective mirror 817 and then is input to the red optical modulation device 822. The green light component reflected by the dichroic mirror 813 is reflected by the dichroic mirror 814 and then is input to the green optical modulation device 823. The blue light component reflected by the dichroic mirror 813 passes through the dichroic mirror 814. As for the blue light component, in order to prevent light loss due to a long optical path, a light-guiding device 821 including the entry lens 818, the relay lens 819, and the exit lens 820 is provided. The blue light component is input to the blue optical modulation device 824 through the light-guiding device 821.

Three color light components modulated by the respective optical modulation device are input to the cross dichroic prism 825. The cross dichroic prism 825 is formed by bonding four rectangular prisms, and a dielectric multi-layer film reflecting the red light component and a dielectric multi-layer film reflecting the blue light component are formed in an X shape at the boundaries. The three color light components are synthesized by the dielectric multi-layer films, thereby forming light indicating a color image. The synthesized light is projected to a screen 827 through the projection lens 826 as a projection optical system, and thus an image is enlarged and displayed.

Since the light from the lamp 811 in the light source 810 is converted into approximately parallel light by the reflector 812, the entry angle of the source light to the optical modulation device 822, 823, and 824 is at most about 12°. The projected image is formed from the entry light. Here, when the liquid crystal display device according to the aforementioned embodiments is used as the optical modulation device 822, 823, and 824, it is possible to enhance the contrast ratio in the normal direction and within a range of small polar angles. Therefore, it is possible to enhance the contrast ratio of the image projected to the screen 827.

Another specific example of the electronic apparatus according to the exemplary embodiments may be a mobile phone. The mobile phone includes the liquid crystal display device according to the aforementioned embodiments or the modifications thereof as a display unit. Other examples of the electronic apparatus may include an IC card, a video camera, a personal computer, a head mount display, a facsimile having a display function, a finder of a digital camera, a portable television, a DSP apparatus, a PDA, an electronic pocket book, an electronic display board, an advertisement and public notification display, and the like.

The technical scope of the exemplary embodiments of the present invention include various modifications without departing from the scope or spirit of the exemplary embodiments. For example, although the liquid crystal display device including TFT as a switching element has been exemplified in the aforementioned embodiments, a two-terminal element such as a thin film diode may be employed as the switching element. Although the transmissive liquid crystal display device has been exemplified in the aforementioned embodiments, the liquid crystal display device according to the exemplary embodiment may be applied to a reflective or transflective liquid crystal display device. Although the three-plate projection display apparatus has been exemplified as the electronic apparatus, the liquid crystal display device according to the exemplary embodiments may be applied to a single-plate projection display apparatus or a direct-view display apparatus.

What is claimed is:

1. A liquid crystal display device, comprising:
   a liquid crystal panel having a pair of substrates and a twisted nematic liquid crystal layer interposed between the pair of substrates, the liquid crystal panel having a light-entry side and a light-exit side;
   a light source applying light to the light-entry side of the liquid crystal panel;
   a first optical compensating plate disposed at the outside of the substrate at the light-entry side of the liquid crystal panel, the first optical compensating plate including hybrid-aligned liquid crystal molecules having a negative birefringence property, the first optical compensating plate having a fast axis as seen in a normal direction that is normal to the first optical compensating plate;
   a second optical compensating plate disposed at the outside of the substrate at the light-exit side of the liquid crystal panel, the second optical compensating plate including hybrid-aligned liquid crystal molecules having a negative birefringence property, the second optical compensating plate having a fast axis as seen in the normal direction, the fast axis of the second optical compensating plate intersecting the fast axis of the first optical compensating plate at an angle other than a right angle; and
   wherein one optical compensating plate of the first optical compensating plate and the second optical compensating plate is disposed such that the fast axis direction thereof is different from an alignment control direction of the substrate corresponding to the one optical compensating plate.

2. The liquid crystal display device according to claim 1, the second optical compensating plate being disposed such that the fast axis direction of the second optical compensating plate is different from an alignment control direction of the substrate at the light-exit side in the liquid crystal panel.

3. The liquid crystal display device according to claim 1, an intersection angle at which the fast axis of the first optical compensating plate and the fast axis of the second optical compensating plate is set within a range of 91° to 110°.

4. The liquid crystal display device according to claim 1, the first optical compensating plate being disposed such that the fast axis of the first optical compensating plate is parallel to an alignment control direction of the substrate at the light-entry side in the liquid crystal panel.

5. The liquid crystal display device according to claim 1, each phase retardation property of the first and the second optical compensating plate with respect to a viewing direction normal to the first optical compensating plate is set within a range of 10 nm to 30 nm.

6. A projection display apparatus, comprising:
   the liquid crystal display device according to claim 1 being an optical modulation device.

7. The liquid crystal display device according to claim 1, the first optical compensating plate having a first surface and a second surface, the first surface facing the substrate at the light-entry side in the liquid crystal panel, the second surface being opposite from the first surface, liquid crystal molecules at the first surface of the first optical compensating plate being oriented with optical axes that form a first angle with a normal direction of the first optical compensating plate and liquid crystal molecules at the second surface of the first optical compensating plate being oriented with optical axes that form a second angle with the normal direction of the first optical compensating plate, the first angle being larger than the second angle, and
the second optical compensating plate having a third surface and a fourth surface, the third surface facing the substrate at the light-exit side in the liquid crystal panel, the fourth surface being opposite from the third surface, liquid crystal molecules at the third surface of the second optical compensating plate being oriented with optical axes that form a third angle with a normal direction of the second optical compensating plate and liquid crystal molecules at the fourth surface of the second optical compensating plate being oriented with optical axes that form a fourth angle with the normal direction of the second optical compensating plate, the third angle being larger than the fourth angle.

* * * * *